(No Model.)
J. McMURTRY.
RAILROAD SPIKE.
No. 314,862.        Patented Mar. 31, 1885.
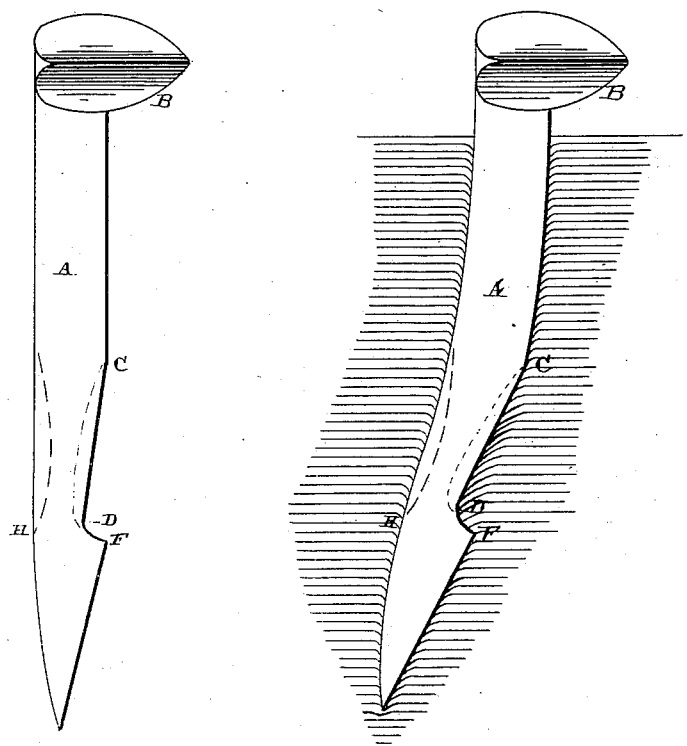
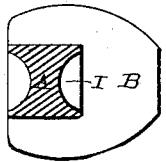

UNITED STATES PATENT OFFICE.

JOHN McMURTRY, OF LEXINGTON, KENTUCKY.

RAILROAD-SPIKE.

SPECIFICATION forming part of Letters Patent No. 314,862, dated March 31, 1885.

Application filed May 13, 1884. (No model.)

*To all whom it may concern:*

Be it known that I, JOHN MCMURTRY, of Lexington, in the county of Fayette and State of Kentucky, have invented certain new and useful Improvements in Railroad-Spikes; and I do hereby declare the following to be a full, clear, and exact description of the invention, such as will enable others skilled in the art to which it pertains to make and use it, reference being had to the accompanying drawings, which form part of this specification.

My invention relates to an improvement in railroad-spikes; and it consists in a spike having a straight beveled edge upon one side of its point, and a slightly curved edge upon the other side, and having a groove or indentation made in both of its sides, and which spike has a curved indent or shoulder in contradistinction to a square one, as will be more fully described hereinafter.

The object of my invention is to provide a spike which has its point provided with unequal bevels on opposite sides, so as to cause the spike to bend slightly while being driven into the wood, and to take a firm hold thereon, without liability of being broken either while being driven in or when being pulled out.

Figure 1 is a side elevation of a spike ready to be driven. Fig. 2 is a similar view showing the spike after it has been driven. Fig. 3 is a horizontal cross-section of the same.

A represents a spike which has the head B to project beyond its inner side, in the manner shown. Upon this inner side the spike is straight down to the point C, from which point to the point D one side of the spike is cut away or indented, as shown. From this point D springs the shoulder, which is curved upon its top, as shown, in contradistinction to the straight shoulder, such as has heretofore been used. From the point F of the shoulder the spike is beveled away to its lower edge for the purpose of causing the spike to assume the position shown in Fig. 2 when driven into the wood, and thus cause it to take a better and a firmer hold upon the wood, and thereby be less liable to be shaken loose or easily pulled out. Owing to this bevel or inclination of the point on its inner side, when the spike is driven the point turns sufficient in driving to cause the head of the spike to impinge on the head of the rails. The outer side of the spike is perfectly straight from the head down to the point H, and from this point H to the point of the spike the side is beveled away, as shown, but to a much less degree than upon the inner side. This point is beveled away on the outer side, so as to counteract the tendency of the greater bevel on the inner side of the spike to cause it to curve to such an extent that the spike is liable to be broken in driving. The lesser bevel on the outer side also has a tendency to cause the spike to curve, but in the opposite direction from the bevel on the opposite side, and the consequence is that when the spike is being driven the two inclinations act in opposition to each other, and thereby prevent the spike from being curved to such an extent to endanger the safety of the spike, and at the same time making the spike much easier to drive.

In order to enable the wood to take a much better hold upon the spike, an indentation, groove, or recess, I, is made in the inner side of the spike, as shown in Fig. 3, into which the wood will spring, and thus assist in holding the spike in place. This indentation does not extend entirely across the spike, but leaves the corners or edges of the spike complete and unbroken. This indentation or groove is preferably made on the inner side of the spike; but may also be on the outside, thus tending to give additional adhesion in the wood, and also make a lighter spike without endangering its strength.

I am aware that spikes have heretofore been made having their ends beveled or sharpened upon both sides, grooves in their sides, and shoulders upon one side; but these features have never been combined in a single spike as here shown and described.

Having thus described my invention, I claim—

A railroad-spike having the front side of its lower end beveled away on a straight line, and the opposite side also beveled, but made slightly rounding, and provided with a rounded shoulder, F, on the front side, and with the grooves I on both the front and rear side, substantially as shown and described.

In testimony whereof I affix my signature in presence of two witnesses.

JOHN McMURTRY.

Witnesses:
JOHN T. GUNN,
J. T. BRUCE.